H. E. SCHINDLER.
TIRE.
APPLICATION FILED JULY 6, 1907.
917,493.
Patented Apr. 6, 1909.
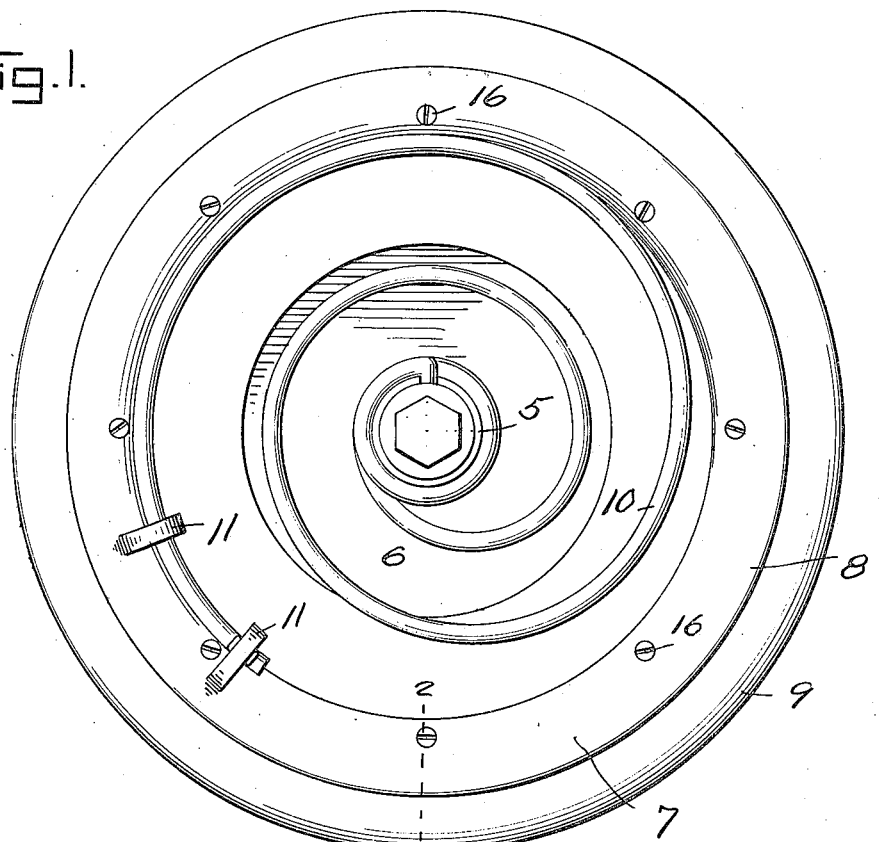
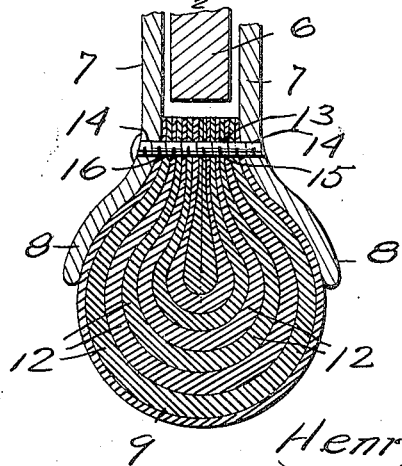
Witnesses
G. R. Thomas
Inventor
Henry E. Schindler
By Chandler & Chandler
Attorneys

UNITED STATES PATENT OFFICE.

HENRY E. SCHINDLER, OF SISSETON, SOUTH DAKOTA.

TIRE.

No. 917,493.      Specification of Letters Patent.      Patented April 6, 1909.

Application filed July 6, 1907. Serial No. 382,467.

*To all whom it may concern:*

Be it known that I, HENRY E. SCHINDLER, a citizen of the United States, residing at Sisseton, in the county of Roberts, State of South Dakota, have invented certain new and useful Improvements in Tires; and I do hereby declare the following to be a full, clear, and exact description of the invention, such as will enable others skilled in the art to which it appertains to make and use the same.

The present invention has reference to tires designed especially for the wheels of motor vehicles, and it aims to provide an extremely durable and completely puncture-proof article of that class.

To this end the tire comprises a solid body-portion formed of a series of layers of heavy textile fabric saturated with a vulcanizable rubber solution and folded together longitudinally with the sides of the innermost layer bearing flatly against each other to form a web which is adapted to fit in the flange of a two-part concave rim, and which is firmly clamped between the parts of the rim by transverse clamp bolts, whereby the inner portions of the folded web are tightly compressed and the outer portions caused to assume a semi-cylindrical form. The tire body is provided with an exterior coating or layer of rubber, the outer layer and the several fabric layers being vulcanized together to form an approximately unitary structure.

The invention will be readily understood from a consideration of the following detailed description, and its preferred embodiment is illustrated in the accompanying drawings in which like parts are designated by corresponding reference numerals in the views.

Of the said drawings Figure 1 is a front elevation of a wheel equipped with a tire constructed in accordance with the present invention. Fig. 2 is an enlarged transverse section taken on the line 2—2 of Fig. 1.

Referring more particularly to the drawings the numeral 5 indicates the hub of the wheel which is provided with a vertical annular flange 6, the flange extending into the chamber formed between the pair of annular plates 7 whose concaved outer edges 8 form the rim in which the tire 9 is seated. The hub is yieldingly supported by means of a pair of spiral springs 10 which are made fast at their inner ends to the hub and at their outer ends to a pair of ears 11 formed on the adjacent plate as shown. The above-mentioned features, however, form no specific part of the present invention since they are the subject of a companion application co-pending with this application.

The tire, as shown in Fig. 2 consists of a series of superposed layers 12 of heavy canvas or other suitable fabric folded together longitudinally with the sides of the inner layer lying flat against each other as shown, each layer being previously saturated with a vulcanizable rubber solution. The inwardly directed edges of the several strips therefore form a web 13 which is disposed between the plates 7 the thickness of the web being about equal to the distance between the inner faces of said plates, and considerably less than the diameter of the body portion of the tire as shown. The said body-portion of the tire thus formed is then provided with an exterior coating or layer of rubber, the complete structure being then vulcanized, thus forming a tire which is practically homogeneous and is absolutely puncture-proof.

The plates 7 are provided toward their curved edges 8 with a series of perforations 14 which register with a series of perforations 15 formed through the web of the finished tire. The plates and tire are then clamped together by bolts 16 which pass through the several perforations above referred to.

The compression of the inwardly directed edges of the fabric members forming the web reduces their thickness while the outer portions which are not subjected to the pressure naturally assume the rounded or semi-cylindrical form shown, and thus present the requisite rounded form of the tire. The inner web member being folded upon itself with its flat inner faces bearing flatly against each other forms the center of the tire structure, and does not require the insertion of any extraneous material or core, the members of the tire forming their own core as shown. This is an important feature of the invention and materially decreases the expense of construction and correspondingly increases the efficiency and utility of the device and obviates any tendency of the parts to become separated because of the difference in density between the elements composing the tire. Moreover, no vacant spaces are left in the tire but the whole interior is filled and occupied by the fabric layers which closely engage each other at all points.

It will be apparent from the foregoing that a tire constructed as above described and having its web portion fitted in the chamber between the annular plates will be positively held from displacement from the seat formed by the curved edges of said plates by reason of the clamping bolts. The tire will likewise be completely punctureproof as will be understood.

It is obvious that the tire may be used with any two-part rim the members of which are spaced sufficiently apart from each other to form a chamber into which the web of the tire extends, the walls of the chamber having perforations formed therethrough for the reception of the clamping bolts.

What is claimed, is,

As a new article of manufacture, a wheel tire formed of a plurality of strips of flexible material arranged one upon the other saturated with vulcanizable rubber solution, the inner strip folded longitudinally upon itself and the remaining strips folded longitudinally over each other and over the said folded strip, and a clamping device extending through the superimposed edges of the strips.

In testimony whereof, I affix my signature, in presence of two witnesses.

HENRY E. SCHINDLER.

Witnesses:
L. WM. FOSS,
FRANK M. NEELEY.